United States Patent
Melton

(10) Patent No.: US 7,636,797 B2
(45) Date of Patent: Dec. 22, 2009

(54) LPC CONFIGURATION SHARING METHOD

(75) Inventor: Randall Wayne Melton, Olney, MD (US)

(73) Assignee: Atmel Corporation, San Jose, CA (US)

( * ) Notice: Subject to any disclaimer, the term of this patent is extended or adjusted under 35 U.S.C. 154(b) by 518 days.

(21) Appl. No.: 11/121,875

(22) Filed: May 4, 2005

(65) Prior Publication Data

US 2006/0253614 A1 Nov. 9, 2006

(51) Int. Cl.
*G06F 3/00* (2006.01)
(52) U.S. Cl. ............... 710/9; 710/2; 710/8; 710/10
(58) Field of Classification Search ............ None
See application file for complete search history.

(56) References Cited

U.S. PATENT DOCUMENTS

| | | | | |
|---|---|---|---|---|
| 4,106,092 A | * | 8/1978 | Millers, II | 710/64 |
| 4,162,520 A | | 7/1979 | Cook et al. | 364/200 |
| 5,588,122 A | | 12/1996 | Garcia | 395/250 |
| 6,241,400 B1 | | 6/2001 | Melo et al. | |
| 7,406,711 B2 | * | 7/2008 | Fuchs et al. | 726/21 |
| 2002/0120835 A1 | | 8/2002 | Smith | |
| 2003/0046462 A1 | | 3/2003 | Wolff et al. | 710/100 |
| 2003/0078984 A1 | | 4/2003 | Wu et al. | |
| 2003/0084381 A1 | * | 5/2003 | Gulick | 714/47 |

OTHER PUBLICATIONS

"International Search Report for Application No. PCT/US06/10392", 1 page.

* cited by examiner

*Primary Examiner*—Tariq R. Hafiz
*Assistant Examiner*—Aurangzeb Hassan
(74) *Attorney, Agent, or Firm*—Schwegman, Lundberg & Woessner P.A.

(57) ABSTRACT

Multiple devices coupled to a communication system share a common or same configuration address. For each configuration address, multiple configuration registers are defined by the communication system. Each device sharing a common configuration address responds to a communication command after the configuration address and the configuration register have been identified as being assigned to or associated with the specific device having the assigned configuration address and configuration register.

13 Claims, 4 Drawing Sheets

Fig._1 (Prior Art)

Fig._2 ved an interrupt during a specially marked bus cycle.

LPC CONFIGURATION SHARING METHOD

TECHNICAL FIELD

The present invention relates to an address sharing method and device for a computer communication system.

BACKGROUND ART

The computer industry has established an interface protocol for computer systems, the Low Pin Count (LPC) Interface, specifically to facilitate the industry's transition toward eliminating ISA buses and protocols (e.g., see Intel Low Pin Count (LPC) Interface specification, Aug. 2002, Revision 1.1, Document Number 251289-001). The LPC Interface Specification describes memory, I/O, and DMA transactions and allows legacy I/O motherboard components to migrate from the ISA/X-bus to the LPC Interface and to synchronize system function with a PCI clock to increase performance. The LPC interface offers several advantages over the ISA/X-bus, such as reduced pin count for easier, more cost-effective designs, using less space and power, and improved thermal efficiency. The LPC Interface Specification is software transparent for I/O functions and compatible with existing peripheral devices and applications.

The LPC specification allows system and peripheral suppliers to migrate from ISA/X-bus to future systems not employing an ISA bus while retaining full software compatibility. This allows manufacturers to reduce overall design costs and facilitates the industry's move toward new generation input/output or communication devices. An example of a new generation input/output device is an LPC-based Super I/O device which integrates multiple functions into a single chip, providing cost and board space savings, and incorporating I/O technologies such as USB and 1394 (firewire). Manufacturers also provide general-purpose LPC compatible microcomputers that integrate the functions of conventional 8-bit processors into smaller (low-pin-count) packages having peripheral functions, for example, an on-chip serial interface for synchronous or asynchronous communication, timers, and A/D converters to enable analog signal input into digital-signal processors useful for the control of home electric appliances and office automation equipment. LPC compatible flash memories may interface with non-Intel chipsets via the LPC interface.

The LPC interface specification includes a physical connection of 7 lines, containing 4 lines (LAD) that are used to multiplex commands, addresses, and data, a line for a frame bit signal (LFRAME), a line for a reset signal (LRESET), and a clock line (LCLK). Configuration hosts (CPU) and peripheral devices are both required to minimally implement these signals. An additional 6 signals are optional, expanding the interoperability of the LPC interface.

Referring to FIG. 1, a prior art computer system 100 is typically configured using a processor (CPU) 110 and a core-logic chipset 120, for example, containing north bridge (NB) 121 and south bridge (SB) 122 architecture circuits. The north bridge 121 typically serves as the logic connecting a CPU 110 to a bus such as an ISA bus or a PCI bus, memory (not shown), a video card (AGP) bus (not shown), and the south bridge 122. The south bridge handles most of the input/output or data communications functions of the computer system 100, such as an IDE controller, USB controller or 1394 firewire, onboard sound or audio, an Ethernet or LAN port, modem or wireless access point, DMA functions, interrupts, and power control (all shown as 160). The south bridge also 122 allows input/output (I/O) devices, such as a Super I/O device 140 or generic controller 150, to communicate with the CPU 110 and memory (not shown) via an LPC interface. In addition, the LPC compatible flash memory (bios) 130 may be designed to store system and graphics BIOS code.

The LPC I/O map contains $2^{16}$ (65,536) configuration addresses locations. However, only a few of these configuration address are typically mapped by the south bridge 122 and a typical computer system 100 (e.g., a motherboard) will designate or support a limited number of unreserved LPC configuration addresses. Having a limited number of configuration address locations may pose a problem, because a bus contention problem occurs when multiple devices are assigned the same address and both devices respond when being addressed. Therefore, each LPC device is forced to have a unique address in order to properly operate in an LPC interface environment.

Information relevant to address this type of problem may be found in U.S. Pat. No. 5,588,122 to Garcia, entitled "Universal Buffered Interface for Coupling Multiple Processors Memory Units, and I/O Interfaces to a Common High-Speed Interconnect" which describes coupling a local bus to a global bus and supporting up to four local nodes. However, the interface only allows interrupts during a specially marked bus cycle. U.S. Patent Publication No. 2003/0046462 to Wolf et al. entitled "Methods and Apparatus for Pipelined Bus" describes an interface to computing elements that supports multiple non-interfering transfers concurrently on a bus. However, in Wolf et al., clients are assigned unique identification numbers based upon a mapping from the system address space. Each of these references suffers from a disadvantage of not addressing the problem of multiple devices that have or are assigned the same (configuration) address.

SUMMARY OF THE INVENTION

An exemplary embodiment of the present invention provides a solution (method or device) to prevent contention problems in a bus or communication architecture environment when multiple devices are assigned or have the same or a common (configuration) address or identification number.

A device coupled to a bus or communication system recognizes a common configuration address and does not reply until a configuration register address is identified as being within the range of configuration register addresses assigned to that device.

The present invention provides a solution when two peripheral devices having the same assigned (configuration) address operate in an LPC interface or computer bus environment.

DETAILED DESCRIPTION OF THE INVENTION

Presented in this invention is a device and method allowing multiple peripheral devices to share a single (configuration) address. Non-reserved configuration addresses in current computer systems may be a scarce resource and it is desirable to have multiple peripheral devices, chips, processors, or circuits that share a single configuration address.

Figure 1:
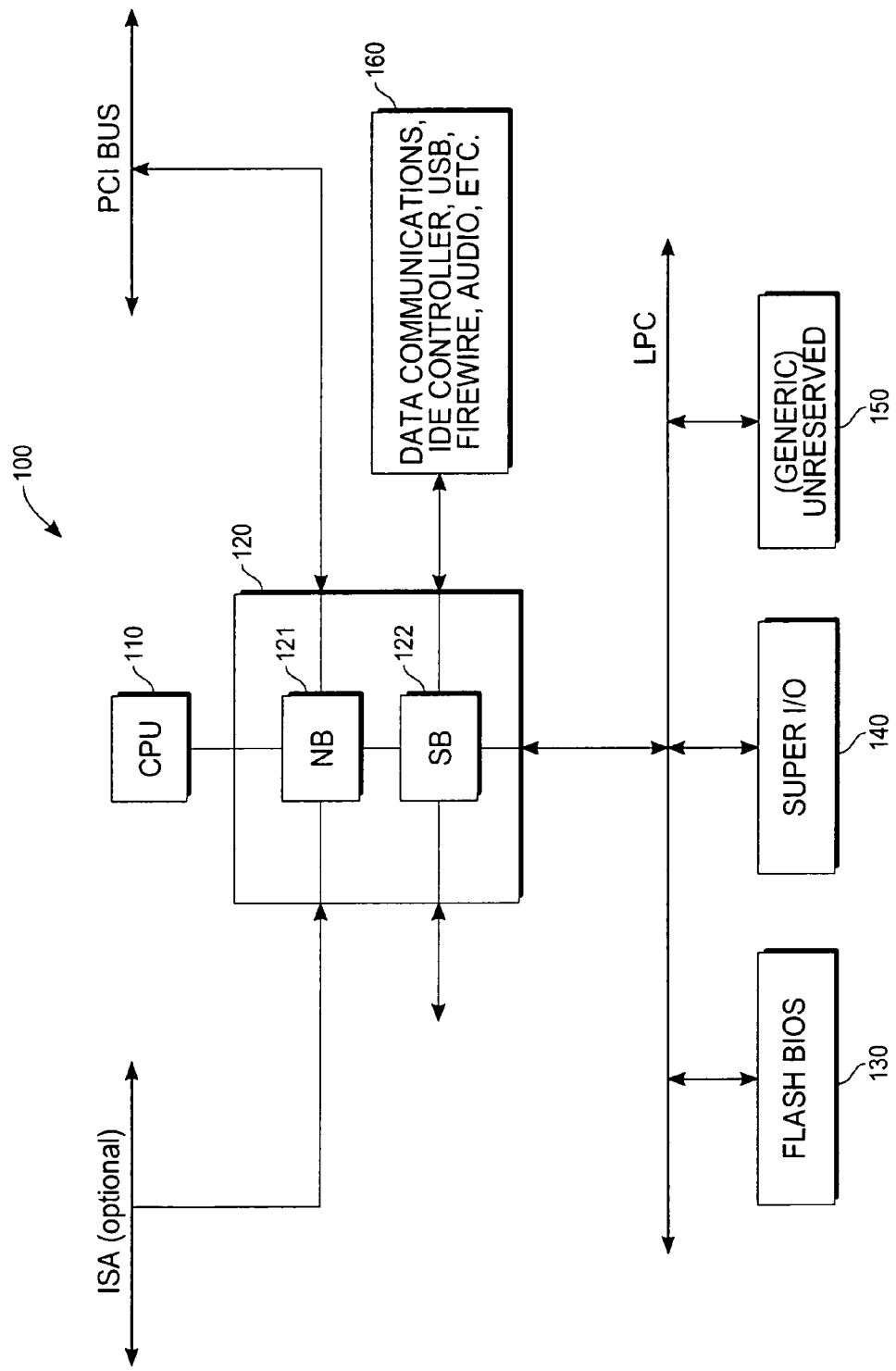
FIG. 1 is a functional diagram of a prior art computer system having an LPC interface.
Figure 2:
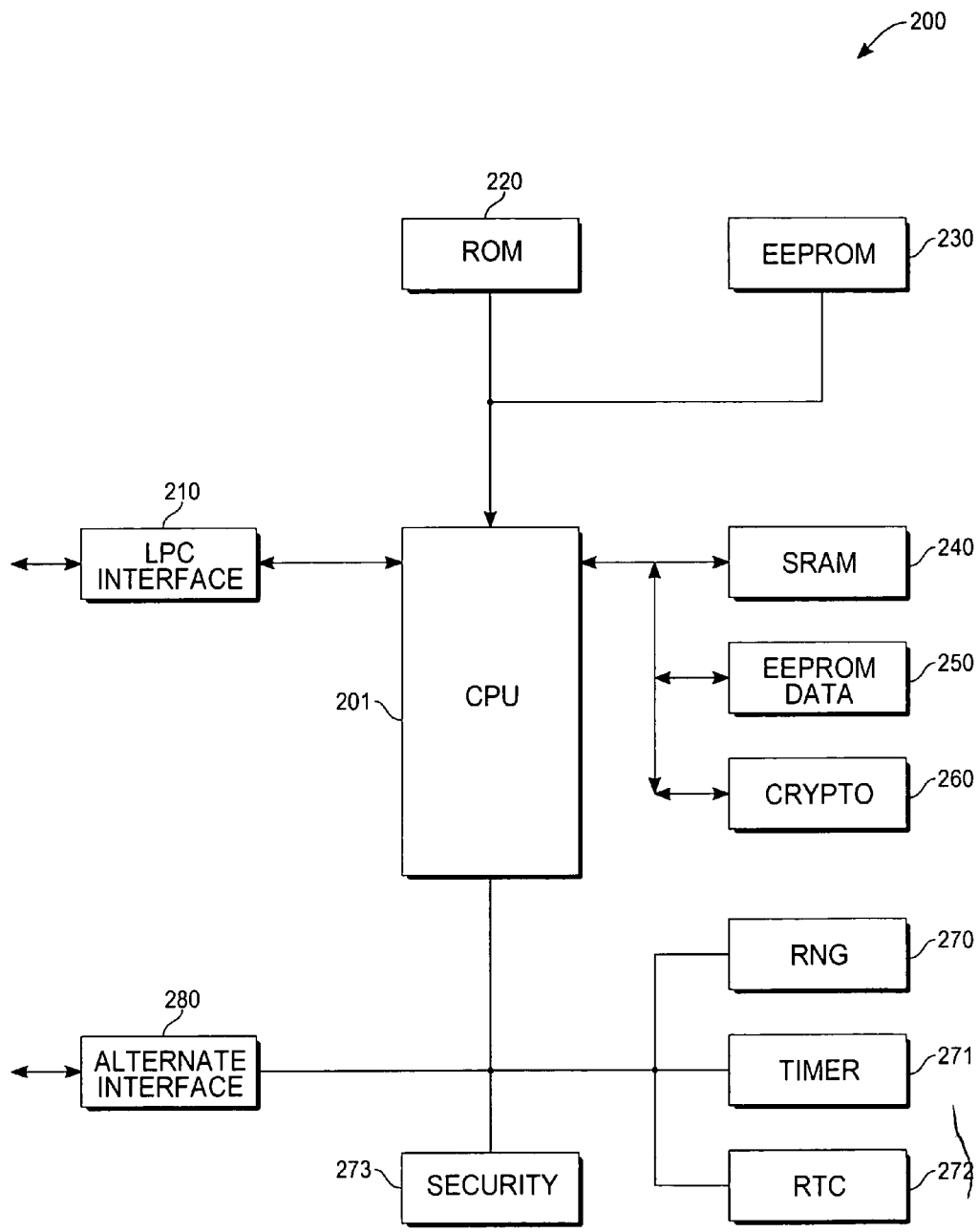
FIG. 2 is a block diagram of a peripheral device that may be coupled to an LPC interface.

In FIG. 2, a peripheral device, such as a security module 200, is coupled to a computer system (not shown) via a communication interface such as an LPC interface 210. The security module 200 includes a CPU 201 that implements a Trusted Computing Platform Alliance (TCPA) specification for Trusted Platform Modules (TPM) adopted by the Trusted Computing Group (TCG). The CPU 201 and associated circuitry includes ROM 220 and EEPROM 230 memory, generally for storing program code, and SRAM 240 and a second EEPROM 250, generally for storing data. The security module 200 includes a crypto accelerator 260, a random number generator (RNG) 270, a timer 271, a real time clock 272, and security circuitry 273. In addition, the security module 200 may also include an alternate interface 280, for example, to other computer systems, communication systems, or circuits (not shown). The LPC interface 210 is coupled to a computer system and is compatible with the LPC interface specification described supra.

An LPC cycle is started by a computer system when the computer system drives the LFRAME line active and then puts appropriate information on the LAD signal lines. Each peripheral device connected to the LPC bus monitors the LAD signal lines when the LFRAME line is active. The computer system then drives information relative to the information or command on the LAD lines, and then (operates in a tri-state mode) monitors the LPC interface for an acknowledgment or response. Generally, the peripheral device responds with an LPC sync code.

Each peripheral device (or chip) on the LPC bus is assigned a unique (or selected) configuration addresses. The LPC I/O map contains $2^{16}$ (65,536) unreserved locations mapped in the lower 64 kB of the LPC decode range. However, only a limited number of unreserved LPC configuration address locations are typically mapped by a computer system or south bridge circuit. A typical computer system (south bridge circuit) will designate or support a limited number of unreserved LPC configuration addresses, for example, 0x2e/0x2f, 0x4e/0x4f, and 0x6e/0x6f. Each configuration address occupies two bytes of LPC I/O address space. The addressing scheme also allows each peripheral device to present 256 addressable configuration registers for each configuration address on the LPC bus.

For example, in a computer system or host containing an LPC interface, 16 configuration registers are mapped into the 4e/4f I/O space of the LPC bus. To read the 16 configuration registers, the computer system would need to issue the following sequence of LPC read operations to configure register 0:

Write 0x00→LPC address 0x004e

Read LPC address 0x004f

To configure register 1, the following sequence of LPC operations would be issued (and so on for the remaining registers 2-16):

Write 0x01→LPC address 0x004e

Read LPC address 0x004f

Each LPC read or write cycle must be acknowledged by the addressed peripheral device. In the case of a read or write cycle, acknowledgment by the addressed (peripheral) device is usually performed by driving a SYNC (ready/OK) or by driving a SYNC WAIT to add wait states. Each peripheral device will typically have a unique address to prevent a bus contention problem. If two peripheral devices were assigned the same address and both devices responded, a bus contention problem would occur. When a new peripheral device is added to a computer system, a free or open (unreserved) configuration address mapped by the south bridge must be available. If a free configuration address is not available and two peripheral devices are configured to have the same LPC address, a bus contention problem occurs.

Although the LPC interface is described in the embodiments below, the present invention is applicable to other interface, bus, or communication architectures where a contention problem occurs when multiple devices are assigned a common address or identification number.

In addition to being assigned a configuration address, each peripheral device is also assigned a range within the organization of 256 configuration registers for each configuration address. To overcome the configuration address and bus contention problem, when a first peripheral device uses less than the 256 available configuration registers, the remaining unused configuration registers may be shared with other peripheral devices. A first and second peripheral device may be assigned the same configuration address, for example 0x4e/4f, as long as the total number and organization of the 256 configuration registers assigned to the second peripheral device do not overlap the configuration registers used by the first peripheral device. Each peripheral device having a common address does not immediately respond to a command from the computer system to the common address until a configuration register is identified by the computer system. The peripheral device that has configuration register assigned to it then replies to the computer system.

Figure 3:
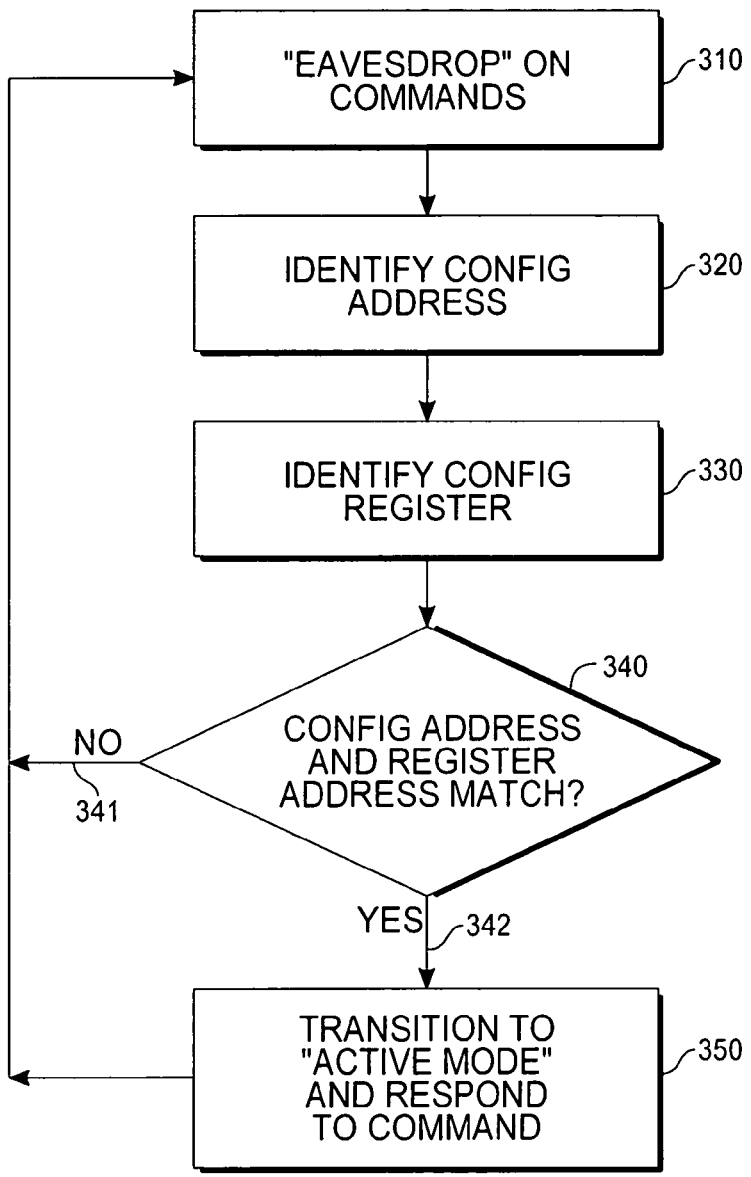
FIG. 3 is flow chart to properly identify a single peripheral device from multiple peripheral devices having the same address.

Referring to FIG. 3, initially, all peripheral devices coupled to an LPC interface operate in a monitor or "eavesdrop" mode 310. The peripheral devices monitor the LPC bus and capture write or read commands that are addressed to the common (shared) configuration address. While a peripheral device is in a monitor or "eavesdrop" mode 310, all reads or writes are ignored. When the host addresses the common configuration address that has been assigned to both the first and second peripherals, the peripheral devices identify 320 their assigned configuration address, for example 0x4e/4f, and remain in monitor mode. Each peripheral device then checks 330 which configuration register is being written to or read. If both the configuration address and configuration register match 342 or are within the range of configuration registers assigned to a particular peripheral device, the peripheral device then transitions into an "active mode" and responds 350 to the command, generally with an LPC sync code or with an appropriate reply. After a response 350 has been issued to the write or read command, a new configuration address or configuration register may be sent from the computer system. A peripheral device continues to operate and respond to the computer system in "active mode," as long as the configuration address and configuration register continue to match. If the new configuration address or configuration register does not match 341, the peripheral device remains in a monitor or "eavesdrop" mode 310 and does not respond to the computer system.

Figure 4:
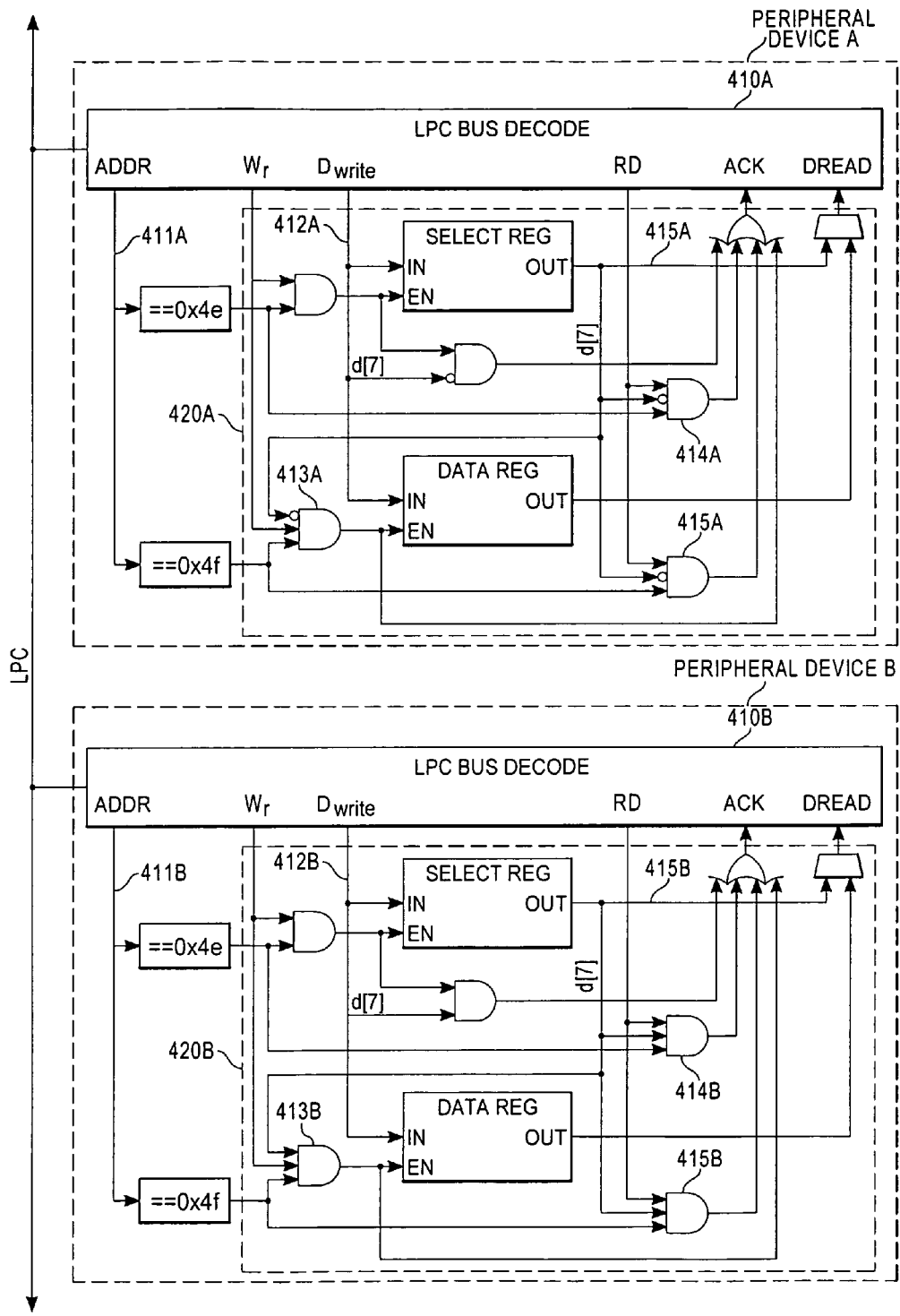
FIG. 4 is a block diagram of a peripheral device interface.

FIG. 4 is an exemplary circuit diagram for two peripheral devices, peripheral device A and peripheral device B, that have been assigned the same configuration address. Each peripheral device is configured to include an LPC bus decode device 410A, 410B and configuration register decode circuitry 420A, 420B. In these circuits, each LPC bus decode circuit 410A, 410B recognizes whether it has been addressed and activates an associated address (ADDR) line 411A, 411B. Any number of particular register lines may be used to assign a configuration register or registers to a particular peripheral device. The register mapping has been divided in this example by using an associated d[7] signal line ($D_{write}$ and select reg out) 412A, 412B to recognize which configuration register is being addressed by the computer system. Configuration register decode logic devices 420A, 420B split the configuration register range by inverting or not inverting the associated signal line d[7] 412A, 412B and signal line d[7] 416A, 416B. Input signals are inverted by peripheral device A by programmed logic devices 413A, 414A, 415A, and not inverted by peripheral device B by programmed logic devices 413B, 414B, 415B.

When a configuration address and configuration register match occurs, peripheral device A transitions into an "active mode" and responds to the command sent by the computer system. The logic devices 413B, 414B, 415B, in peripheral device B having non-inverting inputs do not transition into an active mode when a configuration address and configuration register provide a match for peripheral device A. However, peripheral device B is activated when its assigned configuration address and configuration register match. Peripheral device A is then simultaneously deselected. When peripheral device B is selected and transitions into an "active" mode, peripheral device A continues to monitor (eavesdrop) the command sequences from the computer system, waiting for a configuration address and configuration register match.

Those of skill in the art will recognize that the invention can be practiced with modification and alteration within the spirit and scope of the appended claims and many other embodiments will be apparent to those of skill in the art upon reading an understanding the above description. For example, the above disclosure describes a host (computer system) to peripheral device communication method (and device). However, the communication method (and device) also applies to host-to-host or peripheral-to-peripheral communications in a computer, networked, or communication system. In addition, although the LPC communication specification is referred to, the present invention may be applied in other communication environments such as a microprocessor or microcontroller interfacing with various peripheral devices in a non-computer application. The description is thus to be regarded as illustrative instead of limiting.

What is claimed is:

1. An address sharing method comprising:
   coupling at least two peripheral devices to a communication system;
   assigning a common configuration address to each peripheral device;
   assigning a unique range of configuration registers to each peripheral device;
   sending an address command to the common configuration address;
   sending a register command addressing a configuration register at the common configuration address;
   monitoring the address and register commands by each peripheral device;
   identifying the common configuration address;
   identifying a configuration register address as being within the unique range of assigned configuration registers for a single peripheral device;
   issuing a response from the single peripheral device having the identified configuration register within the unique range of assigned configuration registers for the single peripheral device, wherein the single peripheral device will not issue a response until its common configuration address and the configuration register address are within the range of the assigned configuration registers to prevent contention among the at least two peripheral devices; and
   wherein the step of issuing a response from the single peripheral device includes sending a synchronization code from the single peripheral device to the communication system.

2. The method of claim 1 wherein steps of sending the address command and sending the register command are performed using a south bridge circuit architecture in a personal computer system.

3. The method of claim 1 wherein the communication system defines an addressable range of 256 configuration registers.

4. The method of claim 3 wherein the assigned unique range of configuration registers to each peripheral device is a subset of the addressable range of 256 configuration registers.

5. An interface address sharing method comprising:
   coupling a plurality of devices to a computer interface;
   assigning a common configuration address to each of the plurality of devices;
   assigning a range of configuration registers to each of the plurality of devices, each device having a unique assigned range of configuration registers;
   driving an address command to the selected configuration address;
   driving a register command to address a configuration register;
   monitoring commands for the assigned configuration address by each of the plurality of devices;
   identifying the common configuration address and identifying a configuration register as being within the unique range of assigned configuration registers for a single device;
   issuing a response from the single device, wherein the single device will not issue a response until its common configuration address and the configuration register are within the range of the assigned configuration registers to prevent contention among the at least two peripheral devices; and
   wherein the step of issuing a response from the single device includes the single device driving a synchronization code on the computer interface.

6. The method of claim 5 wherein the steps of sending the address command and sending the register command are performed using a south bridge circuit architecture in a personal computer system.

7. The method of claim 5 wherein the computer interface defines an addressable device range of 256 configuration registers.

8. The method of claim 7 wherein the assigned range of configuration registers to each of the plurality of devices is a subset of the 256 configuration registers.

9. An interface system, comprising:
   a communication interface coupled to at least one peripheral device, the communication interface capable of effecting a communications protocol, the communications protocol configured to:
   assign a common configuration address to the at least one peripheral device;
   assign a range of configuration registers to the at least one peripheral device and any other peripheral device, the at least one peripheral device and the any other peripheral device each being assigned a unique range of configuration registers;
   monitor the communication interface for an address command sent to the common configuration address;

identify the common configuration address;

monitor the communication interface for a register command to address a configuration register at the common configuration address;

identify a configuration register address as being within the range of assigned configuration registers;

issue a response from a single device of the at least one peripheral device or any other device having the configuration register within the unique range of assigned configuration registers for the single device, wherein the single device will not issue a response until its common configuration address and the configuration register address are within the range of the assigned configuration registers to prevent contention among with any other peripheral device; and wherein the response from a single one of the at least one peripheral device or any other device is a defined synchronization code.

10. The interface system of claim 9 wherein the communication interface is coupled to a south bridge circuit in a personal computer system.

11. The interface system of claim 9 wherein the communication interface conforms to a Low Pin Count (LPC) interface specification.

12. The interface system of claim 9 wherein the communication interface defines an addressable range of 256 configuration registers.

13. The device of claim 12 wherein each assigned range of addressable configuration registers is a unique subset of the addressable range of 256 configuration registers.

* * * * *

UNITED STATES PATENT AND TRADEMARK OFFICE
CERTIFICATE OF CORRECTION

PATENT NO. : 7,636,797 B2  Page 1 of 1
APPLICATION NO. : 11/121875
DATED : December 22, 2009
INVENTOR(S) : Randall Wayne Melton It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 707 days.

Signed and Sealed this

Twenty-first Day of December, 2010

David J. Kappos
*Director of the United States Patent and Trademark Office*